United States Patent
Larson et al.

(10) Patent No.: US 7,535,347 B2
(45) Date of Patent: May 19, 2009

(54) AUTOMATED SYNCHRONIZED SERVICE INTERVALS FOR VEHICLES

(75) Inventors: Gerald L. Larson, Fort Wayne, IN (US); Kevin R. Carlstrom, Fort Wayne, IN (US); Steven P. Miller, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 351 days.

(21) Appl. No.: 11/464,881

(22) Filed: Aug. 16, 2006

(65) Prior Publication Data
US 2008/0042820 A1     Feb. 21, 2008

(51) Int. Cl.
*B60Q 1/00* (2006.01)
(52) U.S. Cl. .................. 340/457.4; 340/438; 340/457; 701/30
(58) Field of Classification Search ............... 340/457, 340/438, 457.4, 439, 450.3; 701/29, 30, 701/33
See application file for complete search history.

(56) References Cited

U.S. PATENT DOCUMENTS

| | | | | |
|---|---|---|---|---|
| 4,533,900 A | * | 8/1985 | Muhlberger et al. | 340/457.4 |
| 4,706,193 A | * | 11/1987 | Imajo et al. | 701/30 |
| 4,739,482 A | | 4/1988 | Wrigge | |
| 5,592,395 A | | 1/1997 | Braun et al. | |
| 5,705,977 A | * | 1/1998 | Jones | 340/457.2 |
| 5,819,201 A | * | 10/1998 | DeGraaf | 701/208 |
| 6,301,531 B1 | | 10/2001 | Pierro et al. | |
| 6,370,454 B1 | * | 4/2002 | Moore | 701/29 |
| 6,459,969 B1 | * | 10/2002 | Bates et al. | 701/29 |
| 6,480,105 B2 | | 11/2002 | Edwards | |
| RE39,845 E | * | 9/2007 | Hasfjord et al. | 340/438 |

* cited by examiner

*Primary Examiner*—Brent Swarthout
(74) *Attorney, Agent, or Firm*—Mark C. Bach; Jeffrey P. Calfa

(57) ABSTRACT

A system and process for optimizing vehicle service intervals for a plurality of vehicle service items begins with determination of a minimum service interval. The minimum service interval is set by the need to provide critical, though routine services such as engine oil changes and chassis lubrication. Multiple potential service intervals exist for at least one component, typically engine oil changes, based on different vehicle operating variables. Depending upon the character of vehicle use, one variable will control determination of the recommended interval for engine oil, which, after conversion to distance, is compared with the chassis lubrication to find the minimum service interval. Additional components/fluids are included for service based on operational variables selected to determine service intervals for these components.

4 Claims, 4 Drawing Sheets

AUTOMATED SYNCHRONIZED SERVICE INTERVALS FOR VEHICLES

BACKGROUND OF THE INVENTION

1. Technical Field

The invention relates to optimizing service intervals and synchronizing service of routine service items on vehicles.

2. Description of the Problem

Truck fleet operation is highly competitive and fleet operators are highly conscious of the need to balance preventive maintenance costs, repair costs, fleet operational availability and vehicle replacement costs. While cost effective fleet management demands preventive maintenance, rigid adherence to service schedules set in service manuals for each of long list of vehicle systems requiring recurring service can be inefficient. Optimum service intervals, and the selection of components/fluids for service or change, may vary depending upon the character of the use to which the vehicle is put. Complicating the determination of a service interval is that the best operating variable available for scheduling a particular item for service may not be distance traveled. For example, oil changes for a vehicle equipped with in an internal combustion engine are ideally based on an objective determination of the condition of the oil. Making a direct determination of oil condition is currently difficult but better proxies for oil condition than miles traveled are obtainable. These may be total hours of operation or fuel consumed since the last oil change.

Many contemporary vehicles are equipped with body computers, local controllers and controller area networks to implement many aspects of vehicle control. Position determining systems and telematic linkages to central data base management systems ease centralized dispatching and service scheduling. In vehicles designed, built and sold by International Truck and Engine Corporation, an Electrical System Controller ("ESC") carries out the functions of the body computer. Local controllers pass data to each other and to the ESC. A large amount and variety of vehicle operational data is thus available for optimizing vehicle service intervals.

The availability of data processing capability on board vehicles to track vehicle condition and distance traveled, the ability to track a vehicle's position and service history and the ability to coordinate such tracking over a fleet has suggested to others the implementation of service regimens utilizing data relating to vehicle condition. Numerous references in art stipulate to this. However, the need for a simple to implement, readily understood algorithm, that is readily scalable to a more sophisticated regimen remains a need.

SUMMARY OF THE INVENTION

According to the invention there is provided a system and process for optimizing vehicle service intervals for a plurality of vehicle service items. Routine service intervals are set beginning with determination of a minimum service interval. The minimum service interval assures that critical, though routine, service items such as engine oil changes and chassis lubrications occur as needed. The items considered in determining the minimum service interval are termed the primary service items. The determination is dynamic because it is not fixed by the manufacturer's recommendations, but depends upon the character of vehicle use. Typically the primary service items are the engine oil change interval and the chassis lubrication interval. The oil change interval in particular may depend upon factors such as fuel burned or total hours of operation. The result is normalized to distance traveled for comparison to the chassis lubrication interval and the smaller of the intervals becomes the vehicle's minimum service interval.

Once a determination of a minimum service interval has been made, and a service date projected based on this interval tentatively scheduled, a second determination of which of a plurality of secondary service items is to be pulled into the scheduled service date is made based on the operational variable(s) of interest with respect to a particular item.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
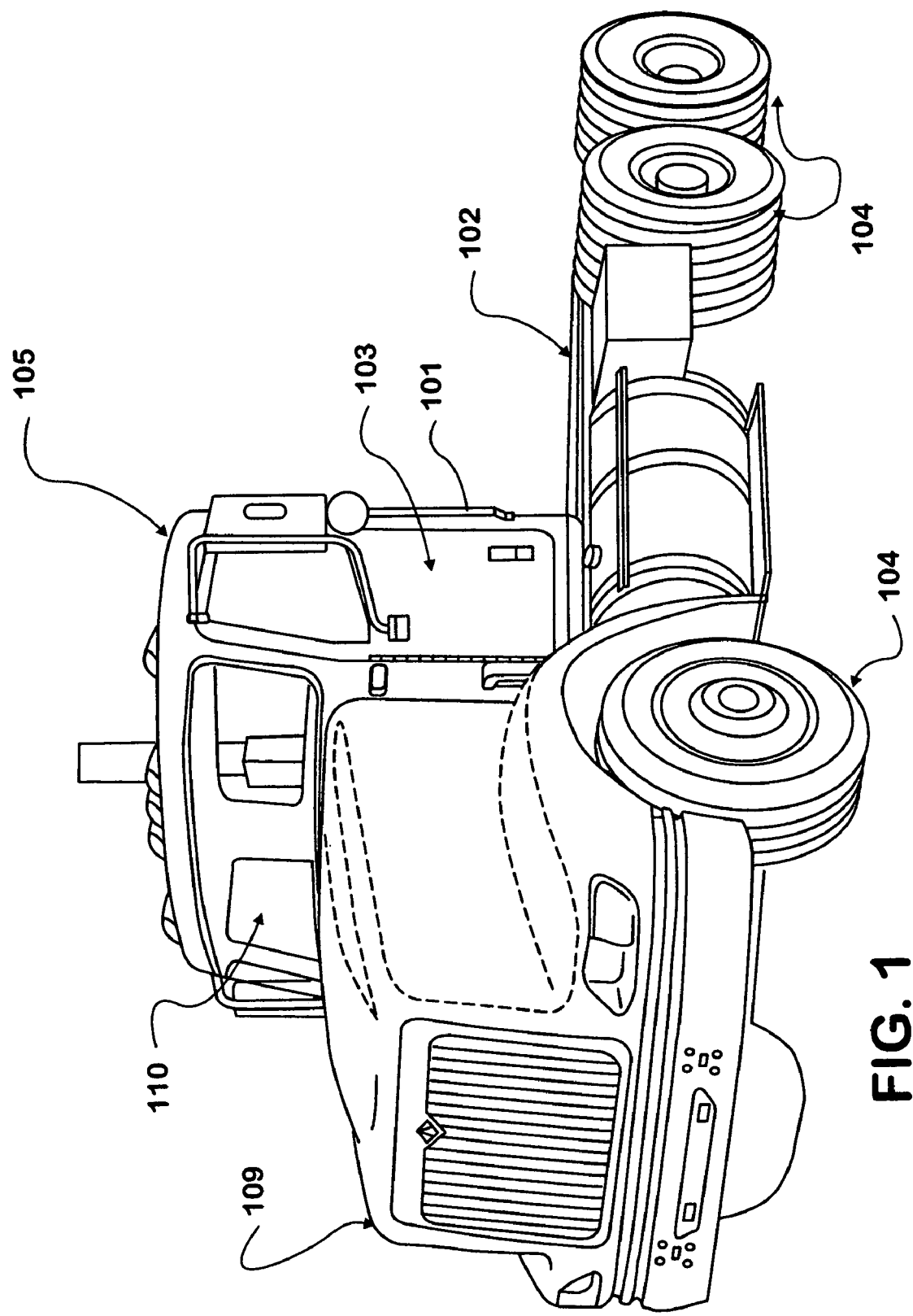
FIG. 1 is a perspective view of a truck.

Referring now to FIG. 1, a perspective view of a truck tractor 105 is illustrated. The truck tractor 105 is conventional, being equipped with wheels 104, a door 103 for access to a cab 101, a frame 102 supported on the wheels 104 and in turn supporting the cab 103 and a hood 109. A windshield 110 with other windows provides the cab 103 greenhouse. Truck tractor 105 requires periodic service of various systems to provide long and reliable service. In the preferred embodiment of the present invention the components/fluids included for service are engine oil and chassis lubrication, which are designated primary service items. These two items control determination of the minimum service interval. Secondary service items include filters (such as those for fuel and air), transmission fluid, tire rotation and replacement, brake servicing, axle lubrication and bearings.

Figure 2:
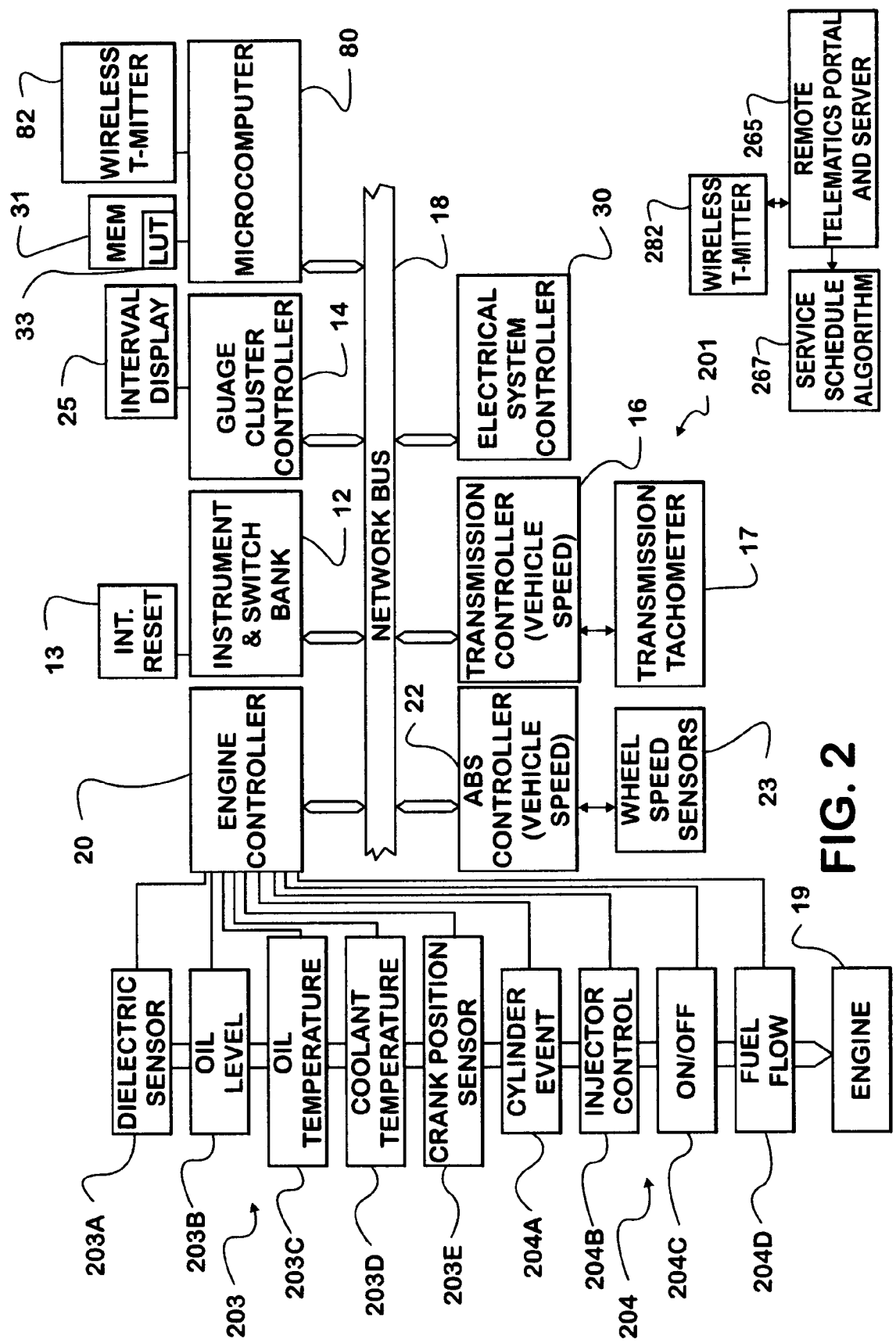
FIG. 2 is a high level schematic of a vehicle control system.

FIG. 2 illustrates a vehicle controller area network (CAN) 201 including the possible local sources of data relating to implementation of an oil change algorithm and the local controllers to which oil change interval information and warnings are sent. Engine controller module 20, instrument and switch bank 12, gauge cluster 14, anti-lock brake system controller 22, transmission controller 16, on board microcomputer 80 and ESC 30 all communicate over network bus 18. At least one controller is presumed to maintain a real time clock.

Engine controller module (ECM) 20, as already discussed, is the local controller which collects most of the required data. ECM 20 is connected to group 203 of engine sensors 203A-E, which include an oil dielectric sensor 203A, an oil level sensor 203B, an oil temperature sensor 203C, a coolant temperature sensor 203D and a crank position sensor 203E. Oil dielectric sensor 203A and oil level sensor 203B may be implemented using a single capacitive sensing element.

Control actuator group 204 includes controllers and counters for events under the control of ECM 20. An ON/OFF controller 204C indicates whether the engine 19 is running.

ECM 20 will provide control signals to injector control 204B. Timing information for the injector control signals of course requires piston position information, which is typically derived from crankshaft position. This information comes from a crankshaft position sensor 203E. ECM 20 also has control over fuel flow 204D and a counter tracking cylinder ignition events 204A.

The present optimization algorithm can provide the vehicle operator a distance estimate until recommended service for each component/fluid. Accordingly, distance traveled is tracked. Vehicle odometer functions complementary to this operation may be combined with a vehicle's anti-lock brake system (ABS) controller 22, which has wheel speed sensors 23 associated with each of the vehicle's wheels. Wheel speed signals may be combined to generate velocity and distance traveled data. Vehicle speed and distance traveled may alternatively be measured by a transmission tachometer 17. The tachometer signal may be processed with transmission controller 16 by the engine controller 20, which receives the signal over bus 18 enabling determination of vehicle speed, and its integral, distance traveled.

The occurrence of service is preferably noted by the truck operator or a service technician using interval reset inputs 13 to enter data relating to the service. The interval reset inputs 13 may be handled a number of ways. They may be coupled through instrument and switch bank controller 12 to data bus 18 as illustrated. Operators may find it more convenient to have a service technician use a handheld device or personal computer interface to the network bus 18 to enter service data. Data input by an operator or technician indicates items serviced and results in reset of distance traveled and other, related tracking variables.

A service interval display panel 25 (which may be a multipurpose display) under the control of gauge cluster controller 14 may be used to indicate to an operator the distance and date currently estimated until the next required service and whether the distance and date have been locked in. Alternatively a percentage remaining indication may be provided. The service interval optimization program may be executed locally by an on board microcomputer 80 or remotely by a remote telematics portal and server 265. Where executed locally the service interval optimization algorithm is preferably stored in memory 31 and accesses look up tables 33. Remote execution is effected over a wireless link implemented by wireless transceiver 82, coupled to microcomputer 80 and wireless transceiver 282, coupled to remote telematics portal 265, which has local access to a local copy 267 of the service scheduling or interval optimization algorithm. Remote execution of the algorithm aids in coordinating service scheduling across a fleet of vehicles, and potentially can be used as a guide for routing a vehicle to place it near a service center at the time service needs are anticipated.

Figure 3:
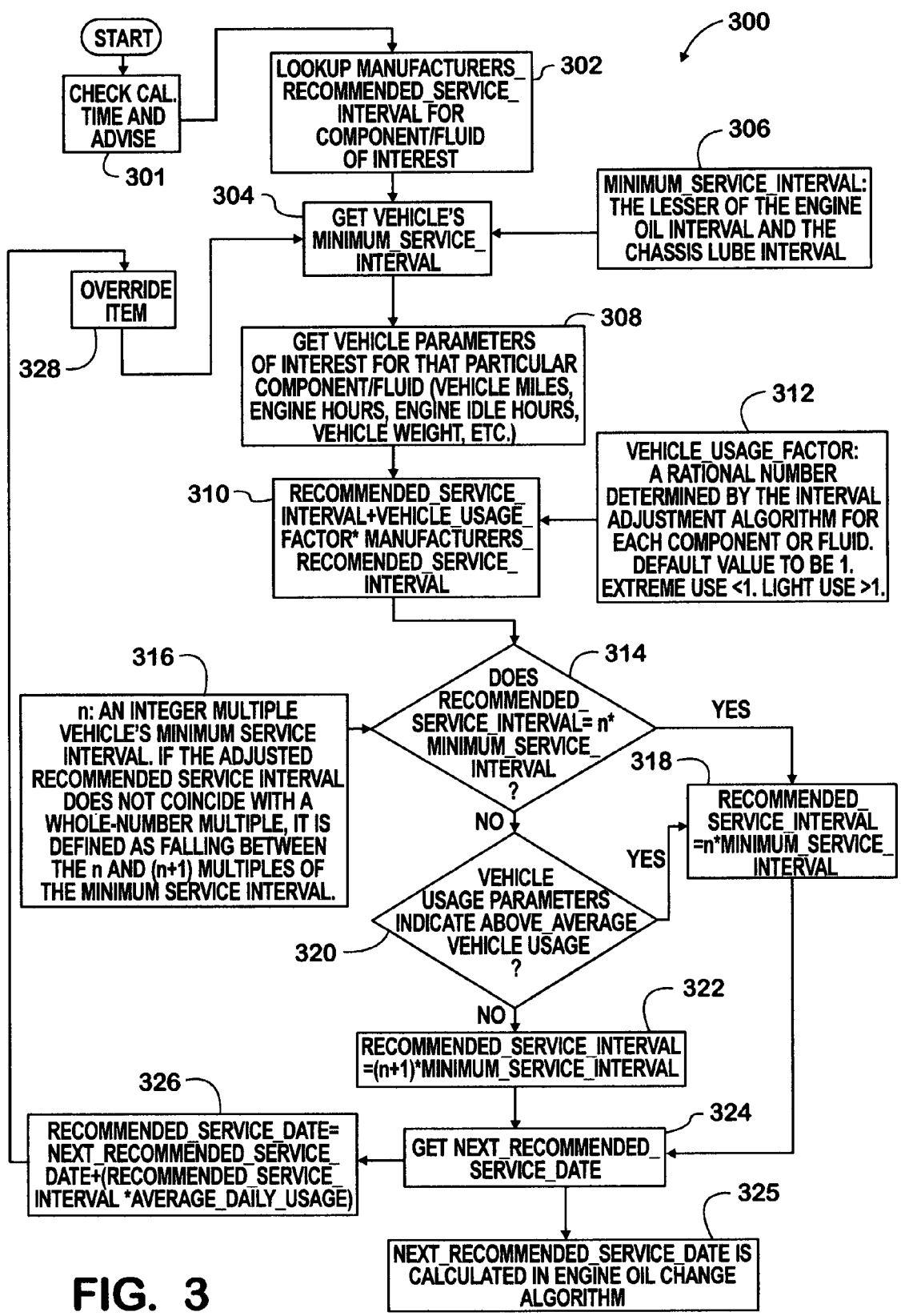
FIG. 3 is a high level flow chart of an interval service algorithm in accord with the teachings of the present invention.

A representative interval optimization algorithm 300 is illustrated in FIG. 3. As already noted, algorithm 300 must determine both an interval and identify items for service at expiration of the interval. Algorithm 300 implements this objective by determining service intervals for each and every item of interest, and then fitting these intervals to a controlling interval for one of the critical service items. In the preferred embodiment the critical service items are engine oil and chassis lubrication. A representative set of secondary service items might include: filters, transmission, tires, brakes, axle lubrication and bearings. Most of these items will have a service interval measured in distance traveled, though not all. The service life for filters may be optimally measured in other variables. For example the fuel filter's service life may be measured in fuel consumed, the air filter in operating hours and brake life in terms of an accumulated estimate of pad wear derived from occurrences of brake application and the duration and total pressure applied to a turning disc. When air filter and fuel filter sensors indicate a blockage, priority is given these items and the usual interval is ignored, however.

Several variables are referenced in the description of the algorithm 300. To avoid confusion the variables are defined here. The "manufacturer's recommended service interval" is an exogenous value which may be expressed in units of distance, liquid measure, time, weight, etc. It reflects a manufacturer's best estimate, usually empirically determined of the service life of a vehicle component or fluid. The "minimum service interval" is a value designated in units of distance derived from one of a selected plurality of manufacturers' recommended service intervals. Because some of the manufacturers' recommended service intervals are defined in terms other than distance the derivation step includes converting all intervals to distance for comparison purposes. Obviously, the intervals defined in terms other than distance will return varying values for distance depending upon how the vehicle is used. The "vehicle usage factor" is a unit-less value derived from vehicle operating variables and is used as a weighting factor when determining the recommended service interval. The "next recommended service date" is exogenously provided by an independent oil change algorithm.

At step 301 calendar time is checked and if the vehicle has been inoperative for a long period, advise service for items such as tire inflation, fluid changes, etc. At step 302 a lookup operation is performed to recover a manufacturer's recommended service interval for a component or fluid of interest. Next, the process of determining a service interval for the vehicle occurs. At step 304 the vehicle's minimum service interval is determined. The minimum service interval, viewed simply, is the lesser of the recommended service interval for the engine oil and the recommended service interval for chassis lubrication. The determination of the these intervals is a non-trivial step, since it does not involve simply looking up a fixed distance interval for engine oil changes.

Referring to side box 306 the minimum service interval is defined as the lesser of the engine oil interval and the chassis lube interval. At the time of writing this application, the chassis lube interval is simply the manufacturer's recommended maximum distance. The situation with regard to engine oil change regimen is more complex.

Figure 4:
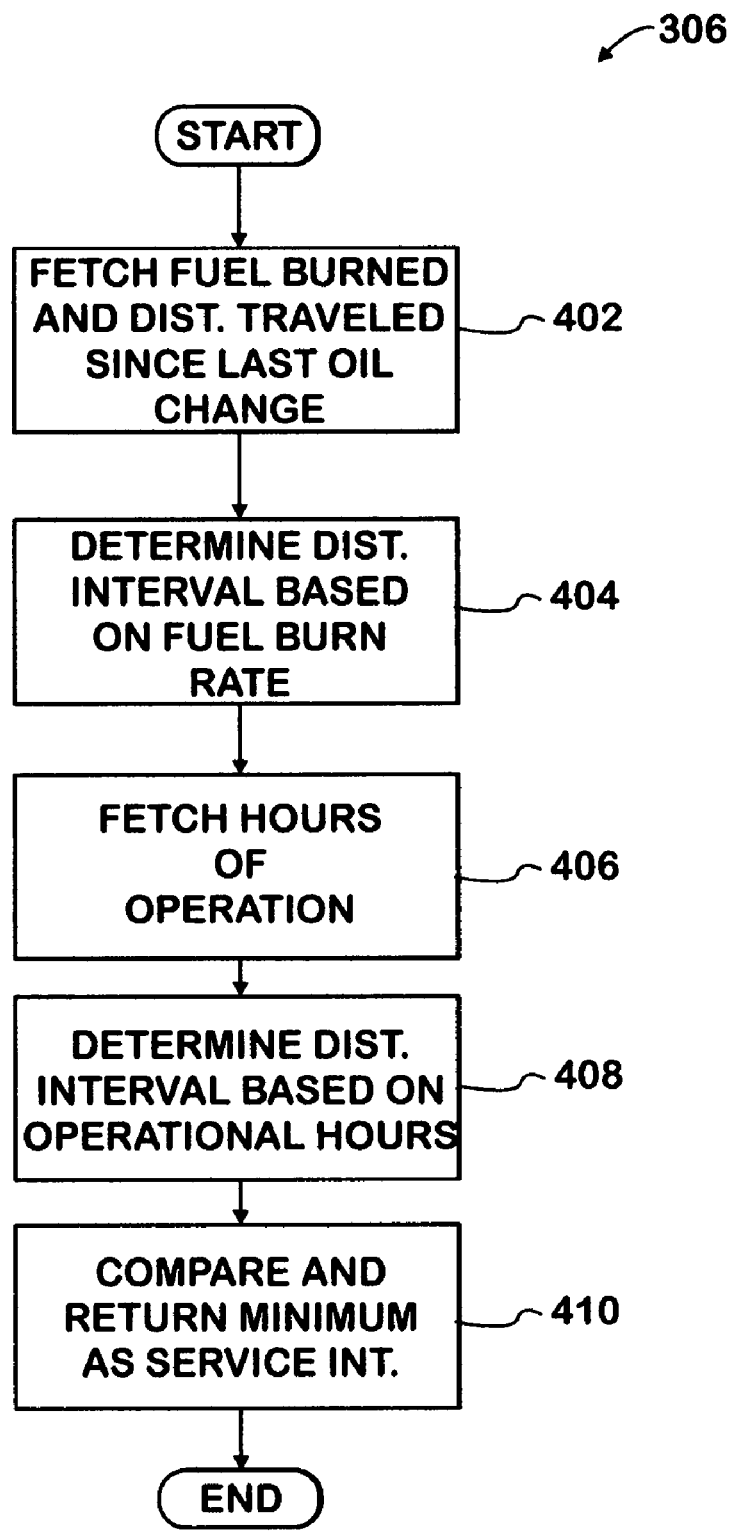
FIG. 4 is a high level flow chart of an engine oil change interval estimation sub-routine.

Temporarily referring to FIG. 4, the determination of the minimum service interval is expanded upon. In overview, oil change intervals are determined based on an estimate of engine oil condition. The art describes a number of ways in which this can be done. For purposes of illustration, oil condition is assumed adequately monitored by monitoring three variables. It is not intended that referring to these three variables be limiting for purposes of this application. The variables used here as indicators of oil condition are fuel burned, hours of engine operation and distance traveled. The manufacturer provides limits for each of these three variables based on empirical data. Two of these three have limits set in variables other than distance.

At step 402 the routine of FIG. 4 retrieves fuel burned and distance traveled since the last engine oil change. The rate of fuel burn is readily determined from these inputs. Next the fuel burn total is subtracted from the fuel burn limit and the remainder multiplied by the fuel burn rate to calculate a distance limit based on fuel consumption (step 404).

Steps 406, 408 illustrate determination of a distance limit based upon a limit in terms of hours of operation. The number of hours the engine has been on is subtracted from a limit interval. The rate of hours per distance unit traveled is multiplied against the remainder to convert the limit into distance. Finally, at step 410, the four available limits, distance between oil changes, distance between chassis lubrications, and the distance limit projections for oil changes based on hours of operation and fuel consumption can be compared and a minimum selected and returned to the main line of the program 300. It may be seen that the limit is dependent upon the character of use to which the vehicle 105 is put. Extended periods at idle tend to make the hours of operation variable the controlling one. Heavy loads, stop and go driving and physically difficult operating conditions tend to make fuel consumption the limiting variable. The minimum service interval may be made subject to constant update until a relatively short period is left until service is anticipated.

Once a minimum service interval is returned at step 304, the operating variables of interest with respect to a particular component/fluid are retrieved at step 308. As previously indicated these may include for anyone item one or more of the following: vehicle distance traveled; engine hours; engine idle hours; vehicle weight; fuel consumed; among the possibilities. A recommended service interval for each component/fluid is generated from the recommended service interval based on a characterization of vehicle usage. The characterization is preferably objective and is represented by a "vehicle usage factor" calculated at step 312 which is multiplied by the manufacturer's recommended service interval in step 310 to determine a recommended service interval for the item. The default value for the vehicle usage factor is obviously one. Since hard use should reduce the service interval a characteristic vehicle usage factor for "hard use" will be less than one while light use will be characterized by a value greater than one. The vehicle usage factor is determined separately for each component/fluid of interest.

The operation of step 312 may be represented by an equation used to determine each vehicle usage factor:

$$V_{UF} = G(C_1 * \text{Norm/Weight}) + (C_1 * BMEP_N/BMEP) + (C_2 * TEMP_N/TEMP) + \ldots )$$

Where C is the weight given each factor, and "Norm" equals a default vehicle weight and "Weight" means measured weight, BMEP means brake mean effective pressure (both normative and measured), and TEMP refers to measured and normal operating temperature. The normative value is always the numerator of the fractions. Other factors are typically considered and included in the equation by the same rule, with appropriate adjustment of the weighting factor.

Next, at step 314, it is determined whether the recommended service interval (that is the result of the evaluation of step 310) is a whole number multiple of the minimum service interval of step 304. Manufacturer's recommended service intervals are established so as to at least equal the possible minimum service intervals. Hence a value of at least 1 should be returned for N. Should N be a whole number execution advances along the YES branch to step 318 to determine a recommended service interval for the component of interest. Obviously where N=1 the service interval will coincide with the minimum service interval, in other words, service of the component/fluid is pulled into the next scheduled service at step 324, which is retrieved from an engine oil change algorithm 325. The item is then scheduled for service (by comparing distance left until service with the daily mileage rate (step 326)) which is used to adjust the next recommended interval (which is added to the next recommended service date returned by the oil change algorithm). Step 328 relates to checks of override items. As already noted, an indication of fuel filter blockage or air filter blockage results in generation of an indication of the need for immediate service.

The "next recommended service date" is exogenously provided by an independent engine oil change algorithm 325 which may be implemented as described in U.S. Pat. No. 6,513,368.

Returning to step 314, it is perfectly possible, indeed likely, that N will not be a whole number integer. Accordingly a NO path from step 314 to step 320 is provided. If vehicle operating variables indicate heavier than average usage N is reduced to the nearest whole number integer and processing follows step 318 as before, as indicated along the YES path from step 320. Otherwise processing continues along the NO path to step 322 where it is provided that N is increased to the next whole number integer (i.e. at least 2) which results in the recommended service interval being modified by multiplication by a positive whole number integer equaling at least 2.

The invention provides for the relative optimization of service intervals for various vehicle components/fluids.

While the invention is shown in only one of its forms, it is not thus limited but is susceptible to various changes and modifications without departing from the spirit and scope of the invention.

What is claimed is:

1. A method of optimizing vehicle service intervals for a plurality of vehicle service items, the method comprising the steps of:
    selecting at least a first primary service item;
    defining a plurality of recommended service intervals for different vehicle operating variables for the first primary service item;
    periodically determining service intervals normalized to distance traveled for the first primary service item and predicting a minimum service interval based on a smallest result of periodic determination of service intervals;
    selecting at least a first vehicle service item other than the first primary service item for service at the minimum service intervals;
    the step of selecting at least the first primary service item comprising:
        monitoring vehicle operating variables determinative of service intervals for a non-primary vehicle service item;
        if required, for a particular non-primary service item, generating a service interval in terms of distance; and
        determining an adjusted service interval for the non-primary vehicle service item based on a ratio of the minimum service interval and a service interval for the non-primary service item and multiplying the service interval for the non-primary service item by the ratio.

2. The method of optimizing vehicle service intervals as claimed in claim 1, further comprising the steps of:
    selecting a second primary service item with a recommended service interval for comparison to service intervals for the first primary service item;
    when determining the minimum service interval comparing the recommended service interval for the second primary service item with possible service intervals for the first primary service item to find shortest in terms of distance; and
    regularly testing for occurrence of a service interval override item.

3. The method of optimizing vehicle service intervals as claimed in claim 2, further comprising the steps of:
    developing a motor vehicle usage factor based on vehicle operating variables for adjusting service intervals including the minimum service interval; and adjusting the service intervals by the motor vehicle usage factor.

4. The method of optimizing vehicle service intervals as claimed in claim 3, the step of developing a vehicle usage factor further comprising:

periodically determining ratios of vehicle operating variables to predetermined norms; and weighting and summing the ratios and dividing the ratios by an index to produce an adjustment factor.

* * * * *